United States Patent [19]
Schulten et al.

[11] Patent Number: 5,318,799
[45] Date of Patent: Jun. 7, 1994

[54] PROCESS FOR TEMPERING THE SURFACE OF A BODY

[75] Inventors: Rudolf Schulten; Behzad Sahabi; Harald Lorson; Kusnanto; Antonio M. Hurtado, all of Aachen, Fed. Rep. of Germany

[73] Assignee: Huls Aktiengesellschaft, Marl, Fed. Rep. of Germany

[21] Appl. No.: 12,596

[22] Filed: Feb. 3, 1993

[30] Foreign Application Priority Data

Feb. 10, 1992 [DE] Fed. Rep. of Germany ....... 4203773

[51] Int. Cl.$^5$ ............................................. B05D 3/02
[52] U.S. Cl. .................................. 427/226; 427/250; 427/255.4; 427/377; 427/379; 427/380; 427/399
[58] Field of Search ............... 427/399, 295, 226, 380, 427/379, 248, 250, 255.6, 377

[56] References Cited

U.S. PATENT DOCUMENTS 4,066,821 1/1978 Cook .................................. 427/399

FOREIGN PATENT DOCUMENTS 0365460 4/1990 European Pat. Off. .

Primary Examiner—Janyce Bell
Attorney, Agent, or Firm—Mark T. Basseches

[57] ABSTRACT

For tempering the surface of a body, the body is covered with a sheath of at least one meltable active substance and binder material and heated under vacuum or in an inert atmosphere first to a temperature whereby the sheath is transformed into a porous cover layer with outer crust. Then the temperature is raised until the meltable active substance contained in the cover layer is evaporated. On the one hand, the meltable active substance seals the outer side of the cover layer, and on the other hand, the meltable active substance produces the tempered surface of the body. After the body has cooled, the residues of the cover layer are removed. The body is provided with a pore-free resistant surface.

17 Claims, No Drawings

PROCESS FOR TEMPERING THE SURFACE OF A BODY

BACKGROUND OF THE INVENTION

This invention relates to a process for tempering the surface of a body, and more particularly to a method of modifying the surface characteristics of a heat resistant body without changing its exterior dimensions.

THE PRIOR ART

Known for the coating of different bodies with different substances are vapor deposition processes, e.g. for Si coating, or vacuum spray processes and the like. These processes require for their execution a high costs of instrumentation and are labor-intensive as well. A special disadvantage of the known processes must be seen in that a pore-free coating is not readily possible with them, and in many cases moreover the adhesion of the coating to the surface of the body is not durable enough.

From EP 0,365,460 there is known also a process for applying coatings on bodies which makes use of powder metallurgy. The coatings may consist for example of a sheath of graphite and a wax, polymer, or cellulose based binder. An additive, e.g. of a copper sulfate/water solution or an iron ammonium oxalate/water solution, may be added to a paste to be prepared for the formation of the sheath. The body sheathed with such a paste is exposed to an oxidizing atmosphere at over 500 degrees C., whereby the binder is removed from the coating material.

In such known processes as well in the other known coating processes, the looked-for improvement of the surface constitution of a body lead to an alteration of the body dimensions from its original dimensions corresponding to the added coating thickness.

SUMMARY OF THE INVENTION

It is an object of the invention to provide a tempering process which not only can be carried out in a simple manner and permits the creation of an abrasion-resistant, pore-free surface of the body, but also ensures that the body dimensions are preserved.

Briefly stated, the object is achieved by intimately enveloping the body in a paste or foil sheath comprised of binder and volatizable active material such as a metal. The coated body is heated in sub-atmospheric environment to reduce the binder to a porous mass having an external seal forming crust. Thereafter, the mass is heated to and kept for a period of time at a temperature sufficiently high to volatilize the metal but not so high as to melt the body. The active ingredient, i.e. the metal, will diffuse into the body. After cooling the remainder of coating is removed.

The sheath enveloping the body to be coated can be made preferably of a kneadable composition which contains a meltable active ingredient, a bonder, and optionally thermoresistant fillers, such as carbides, oxides and the like. As meltable active ingredients may be used, Si, Ti. Zr, Cu, Al, W/Si, Mo/Si SiO2 and similar substances. As binder one uses agglutinant dough-forming substances, such as cereal flour, for example wheat flour, rye flour or starch, or polyethylene and other agglutinant hydrocarbons. The sheath may also be formed of a plastic foil containing the meltable active substance.

To particular advantage the sheath may contain several meltable active substances having different partial pressures, so as to let the active substances act successively as a function of the altered temperature timing program.

Advantageous material mixtures for the production of the sheath are evident from the examples hereinafter provided, in particular with the binder parts varying between 25 and 75% by weight depending on the meltable active substances used.

Tests have shown that especially favorable tempering results can be achieved if the heating rate of to 1000 degrees C. is between 30 degrees C./min and 80 degrees C./min and the heating rate over 1000 degrees C. between 5 degrees C./min and 15 degrees C./min.

The effects of the cover layer on the surface to be tempered can be exhaustively utilized only if the cover layer is kept at the maximum temperature for at least one hour.

Further it has been found through tests that it is advantageous to conduct the cooling of the cover layer to the melting point of the meltable substance at a rate between 5 degrees C./min and 15 degrees C./min.

Depending on the requirements demanded for the tempering, it is appropriate to provide the body with a slip layer of metal powder or powder-ceramic substances before the sheath is applied.

Lastly, a variant of the invention provides adding to the environment of the sheath during the heat treatment traces of inert gases, as e.g. N2.

According to the process of the invention, therefore, the body surface to be tempered is first completely sheathed with for instance a pasty composition, which is applied by kneading or knifing, the sheathing thus formed having a thickness of about 1–10 mm, depending on the form of the body. It is not necessary that the sheath be homogeneous or of constant thickness To the material of the sheath consisting of powders of a vaporizable active substance, as e.g. Si or Ti or the like, and of a binder such a cereal flour or starch or the like, there are added, if necessary, fillers, e.g. carbides or other ceramic materials, in powder form, to increase the consistency of the sheath in the subsequent heat treatment.

The powders forming the sheath material are mixed with clean water or other solvent, e.g. alcohol, to a kneadable mass, which is applied to the surface of the body in the above described manner.

The body thus prepared can be introduced into a furnace, to be brought therein to a high temperature during a time span of 1 to 5 hours under vacuum or in an inert atmosphere. In the temperature range of 200–800 degrees C. the binder in the sheath is decomposed, so that it is transformed into a cover layer with a porous substance skeleton.

As the temperature continues to rise, the meltable active substance in the cover layer becomes mobile and tries to escape to the outside. By chemical reaction of the volatile substance with the porous skeleton, or by capillary condensation of the volatile substances, the cover layer is then sealed to the outside by a crust.

When using nitrogen traces in the vacuum or in the inert atmosphere, nitrides are formed as additional sealing substances. With the use of metals as meltable active substance, and if traces of water vapor or of other oxidizing gases are used, an oxidic material results on the outside of the cover layer, forming a sealing barrier.

The meltable volatile active substances in the matrix of the cover layer will, to the extent that it does not react with the existing decomposed binder and/or with the fillers, get to the boundary layer between the body to be tempered and the cover layer in vaporous or liquid form. There, depending on the nature of the body, it undergoes chemical reaction, is alloyed by diffusion processes, and/or fills the pores of the body by capillary condensation. Thus, for example, during vaporization of Si in the case of a body to be tempered consisting of graphite, SiC is formed, the pores then still open being filled with metallic Si. But if the body to be tempered consists e.g. of steel, then in the melting of e.g. Al the latter will penetrate by diffusion and produce at the surface a Fe/Al alloy, the depth of which depends on the treatment time.

After cooling, the remaining cover layer can be removed completely for example by scraping or brushing.

The surfaces to be tempered according to the process of the invention can be those of a variety of structures. Thus, the surfaces of plates, balls, cylinders, pipes or irregular bodies. such as turbine vanes, can be tempered just as well as those of ceramic fabrics. Also, before the sheath is applied, slip layers, e.g. of ceramic powder, can be applied on the body in a manner known in itself, the pores of which are closed by the meltable active substance of the cover layer.

The surfaces to be tempered may be those of bodies consisting of metals, oxidic ceramic, carbides, nitrides, graphite, carbonized natural substances, and other thermoresistant substances.

To let different reactions in the boundary layer take place independently of each other and staggered in time, it is merely necessary that the cover layer contains several meltable active substances of different melting points.

For multiple tempering of the surface of a body, the process of the invention can also be applied repeatedly, so that any partial deficiencies of a tempering treatment are compensated by one of the subsequent tempering treatments.

Naturally, the meltable active substance, binder, and fillers on the one hand, and the bodies to be tempered, on the other hand, will be chosen so that the thermal elongation of the body material and of the other substances are approximately identical.

Practical examples of the process of the invention are indicated below: (all percentages by weight)

1. SiC/MoSi layer on graphite

| | |
|---|---|
| Body to be tempered: | Graphite (with or without fiber reinforcement). |
| Sheath: | 60% Si powder, 20% MoSi2, 20% starch as binder. |
| Decomposition temperature: | 200–800 degrees C. |
| Length of time: | 1–2 h |
| Reaction temperature: | 1400–1700 degrees C. |
| Length of time: | 1 h |

A layer of SiC and MoSi2 forms in the body surface, the pores being filled with Si. The surface shows high corrosion resistance in air and water vapor up to 1500 degrees C.

2. Al layer on steel

| | |
|---|---|
| Body to be tempered: | Steel plates of alloyed steel (Fe, Cr, Ni). |
| Sheath: | 70% Al powder, 30% flour as binder. |
| Decomposition temperature: | 200–800 degrees C. |
| Length of time: | 1–2 h |
| Reaction temperature: | 800–1200 degrees C. |
| Length of time: | 0.5–1.5 h |

There forms in the body surface a layer consisting of an alloy of Fe, Cr, Ni, Al, which extends 10–100 μm into the interior of the body and is oxidized on after cooling and is highly resistant to corrosion due to formation of Al2o3.

3. Fiber-reinforced foils of ZrSiO4

| | |
|---|---|
| Body to be tempered: | Mixture of 80% ZrO2 and 20% waterglass, mixed to a paste in water and incorporated in ceramic fiber fabrics of Al2O3. |
| Sheath: | 70% SiO2, 30% binder consisting of Al2O3 powder, made into a paste with flour and water. |
| Decomposition temperature: | 200–800 degrees C. |
| Length of time: | 1–2 h |
| Reaction temperature: | 1400–1700 degrees C. |
| Length of time: | 0.5–1.5 h |

The SiO2 reacts with the ZrO2 to ZrSiO4, the pores are stopped with SiO2, the sodium oxides of the waterglass is vaporized. An impermeable fiber-reinforced foil of ZrSiO4 forms.

4. Carbide layers on graphite

| | |
|---|---|
| Body to be tempered: | Graphite with slip layer of carbide, e.g. TiC, ZrC. |
| Sheath: | 50% ZrC, 20% flour as binder. |
| Decomposition temperature: | 200–800 degrees C. |
| Length of time: | 1–2 h |
| Reaction temperature: | 2000 degrees C. |
| Length of time: | 1–2 h |

There forms a layer 100–200 μm thick of mixed carbides (TiC, ZrC), which are fastened to the graphite by Zr metal; the pores are filled with Zr. By formation of ZrC the layer is corrosion resistant to 2000 degrees C. Ti may be used instead of the Zr as volatile active substance. The reaction temperature is then reduced to 1700–1900 degrees C.

5. Fiber-reinforced SiC foils

| | |
|---|---|
| Body to be tempered: | Fabric of SiC fibers, embedded in plastic. |
| Sheath: | 60% Si, 20% SiC, 20% polyethylene as binder. |
| Length of time: | 1–2 h |
| Reaction temperature: | 1400–1700 degrees C. |
| Length of time: | 2–3 h |

A corrosion resistant flexible foil with SiC fiber reinforcement forms.

6. Siliconizing of wood surfaces

| | |
|---|---|
| Body to be tempered: | Wood in the form of boards, tubes and plywood. |
| Sheath: | 70% Si powder, 30% flour as binder. |
| Length of time: | 1–2 h |
| Reaction temperature: | 1400–1700 degrees C. |

| -continued | |
|---|---|
| 6. Siliconizing of wood surfaces | |
| Length of time: | 1-2 h |

The wood is carbonized in the temperature range of 800 degrees C. The carbonized body is shaped by machining, e.g. by grinding or chipping. Then there occurs the covering with the sheath, the decomposition thereof, and he heat treatment of the cover layer in the range of 1400–1700 degrees C. A carbon body with an impermeable tempered surface of SiC is formed.

7. Hollow Body of Sic

By carbonization of wood or plastics the desired preform of the hollow body is produced by heat treatment of to 1000 degrees C. It is brought into the desired from by grinding or chipping or the like and then enveloped from the outside with the sheath of 70% Si and 30% flour as binder. The sheath is transformed by decomposition into the cover layer, which is subjected to a heat treatment in the range of 1400–1700 degrees C. for about 1 hour. A body with an outer layer of Sic is formed.

8. Natural Bodies with Sic-Tempered Surfaces

Natural bodies, as e.g. walnuts, bamboo reeds, dried branches, etc., are enveloped with a sheath. The sheath contains 70% Si powder and 30% flour as binder. By a first heat treatment at 700–800 degrees C. the natural body and the sheath are carbonized simultaneously in about 1 hour. In a second heat treatment in the range of 1400–1700 degrees C. the carbon structures are siliconized in the course of 1–2 h. There are formed bodies with SiC coating whose form is similar to the form of the natural bodies.

9. Impregnation of Ceramic Bodies with Titanium Silicide

Porous bodies, e.g. graphite, Al2O3, etc. are enveloped with a sheath of 30% Ti powder, 40% Si powder and 30% flour as binder. In a heat treatment in the range of 200–800 degrees C. for about 1 h the sheath is carbonized. In addition heat treatment in the range of 1400–1700 degrees C. for 1 h, the Si becomes volatile, and in a subsequent heat treatment of 1700–2100 degrees C. again for about 1 h the Ti becomes volatile. There forms at the boundary faces between the cover layer and the porous body a zone with closed pores containing titanium silicide.

10. Production of BaTiO3 Foils

A foil of a thickness of 0.01 to 1 mm of magnesium oxide fibers is filled with BaO which is suspended with water, alcohol, or other liquids. The foil is dried, and the process is repeated until the BaO has reached one half its theoretical density. The foil thus prepared is covered on both sides with plastic foils, e.g. of polyethylene, containing up to 70% by volume TiO2. In a temperature range of 200–800 degrees C., the plastic is decomposed in 1 h to a porous carbon skeleton. At a further temperature increase to the range of 1700–2100 degrees C. for 2 h the TiO2 evaporates, partially reacting with the carbon to TiC, partially diffusing into the foil and reacting with the BaO to BaTiO3. There is formed a fiber-reinforced foil of BaTiO3 having a high dielectric constant, in which the original magnesium oxide fiber skeleton is present, without substantially affecting the physical properties of the foil.

11. Doping an Al2O3 Foil with Na2O

A foil of MgO is filled with Al2O3 which is suspended with water, alcohol, or other liquid, The foil is dried, and the process is repeated until the Al2O3 has reached 80–90% of its theoretical density. Thereupon the foil is provided on both sides with a sheath consisting of 10% Na2O and 90% dried waterglass. The foil is brought to the temperature range of 300–500 degrees C. in 0.5 h. The sheath then solidifies to a porous cover layer with an outer crust. With further increase of the temperature to 800–900 degrees C. Na2O volatilizes and diffuses into the Al2O3. The temperature of 800–900 degrees C. is maintained for 3–5 h. A dense foil of beta-Al2O3 is formed, containing the original magnesium oxide fiber skeleton, without substantially affecting the physical properties of the foil.

12. Copper Plating or Silver Plating of Natural Bodies

Natural bodies, as e.g. walnuts, bamboo reeds, dried branches, etc., are enveloped with a sheath. The latter contains 70% Cu or Ag powder and 30% flour as binder. By a first heat treatment in the range of 200–800 degrees C. the natural bodies and the sheath are carbonized simultaneously in about 1 h. In a subsequent heat treatment in the range of 1400–2000 degrees C. the carbon structures are copper-plated or silver-plated in 0.5–1.5 h. There are formed bodies with copper or silver coatings whose form is similar to the form of the natural bodies.

Further tests have shown that also plastic foils can be used for the sheath. In analogy to the pasty sheath of kneaded mass, these are provided with the meltable active substances and the fillers. Their use is appropriate in particular for the tempering of plate-like bodies.

As will be apparent to those skilled in the art, numerous variations of the process may be derived without departing from the spirit of the invention which is to be broadly construed within the scope of the appended claims.

Having thus described the invention and illustrated its use, what is claimed as new and is desired to be secured by Letters Patent is:

1. A method for diffusion tempering the surface of a heat resistant body comprising steps of intimately covering the surface of said body with a sheath comprising binder comprised of a substance selected from the group consisting of starch, flour, waterglass, agglutinant hydrocarbons and plastic foils, and a material vaporizable at a temperature below the melt point of said body, heating said sheath covered body under subatmospheric condition to a first temperature in excess of 500 degrees C. and below the melt point of said material to convert said sheath covered body into a crusted body wherein said sheath is converted into a porous cover layer having an outer crust, thereafter heating said crusted body to a second temperature range below the melt point of said body and above the melt point of said material, maintaining said crusted body at a temperature within said second temperature range until said material is at least partially vaporized to thereby effect diffusion of increments of said material into said body, and thereafter cooling said crusted body and removing the sheath components from the surface of said cooled body.

2. The method of claim 1 characterized in that said material is comprised of one or more ingredients selected from the group consisting of Si, Ti, Zr, Cu, W, or MO.

3. The method in accordance with claim 2 wherein said sheath includes materials of different partial pressures.

4. The method in accordance with claim 2 wherein said sheath is a paste comprised of Si, 40–60% by weight binder and 20–30% by weight water.

5. The method in accordance with claim 1 wherein said material is selected from the group consisting of Ti and Zr and said sheath includes 20–40% by weight binder and water.

6. The method in accordance with claim 1 wherein said material comprises Cu and said sheath includes 50–75% by weight binder and water.

7. The method in accordance with claim 1 wherein said binder is selected from the group consisting of flour and starch.

8. The method in accordance with claim 1 wherein said binder comprises a meltable thermoplastic polymer.

9. The method in accordance with claim 1 wherein said material comprises a mixture of W and Si and said sheath includes 45–70% by weight binder and water.

10. The method in accordance with claim 1 wherein said material comprises a mixture of MO and Si and said sheath includes 25–50% by weight binder and water.

11. The method in accordance with claim 1 wherein said material comprises $SiO_2$ and 35–60% by weight binder and water.

12. The method of claim 1 wherein said sheathed body is heated to a temperature in excess of 1000 degrees C., the heating beyond 1000 degrees C. being effected at a rate of between 5 degrees C. per min and 15 degrees C. per min.

13. The method of claim 1 wherein said cooling step is effected at a rate of between 5 degrees C. per min and 15 degrees per min.

14. The method in accordance with claim 1 wherein said crusted body is maintained in said second temperature range for at least one hour.

15. The method in accordance with claim 1 and including the step of applying to the surface of said body in advance of application of said sheath a powder comprised of metal.

16. The method in accordance with claim 1 and including the step of applying to the surface of said body in advance of application of said sheath a powder comprised of ceramic material.

17. The method of claim 1 and including the step of introducing into said sub-atmospheric environment traces of an inert gas such as $N_2$.

* * * * *